US009461691B2

United States Patent
Yan

(10) Patent No.: US 9,461,691 B2
(45) Date of Patent: Oct. 4, 2016

(54) MOBILE COMMUNICATION DEVICE AND MANUFACTURING METHOD THEREOF

(71) Applicant: Wei Yan, Shenzhen (CN)

(72) Inventor: Wei Yan, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 77 days.

(21) Appl. No.: 14/613,787

(22) Filed: Feb. 4, 2015

(65) Prior Publication Data

US 2016/0134321 A1 May 12, 2016

(30) Foreign Application Priority Data

Nov. 12, 2014 (CN) .................. 2014 2 0673151 U

(51) Int. Cl.
*H01Q 1/24* (2006.01)
*H04B 1/3888* (2015.01)

(52) U.S. Cl.
CPC ............ *H04B 1/3888* (2013.01); *H01Q 1/243* (2013.01)

(58) Field of Classification Search
CPC .......... H01Q 1/48; H01Q 1/24; H01Q 1/242; H01Q 1/243; H01Q 5/378
USPC .......................... 343/702, 700 MS, 848, 846
See application file for complete search history.

(56) References Cited

U.S. PATENT DOCUMENTS

| 2010/0039331 | A1* | 2/2010 | Tai ......................... | H01Q 1/243 343/700 MS |
| 2012/0105287 | A1* | 5/2012 | Jung ....................... | H01Q 1/243 343/702 |
| 2012/0188141 | A1* | 7/2012 | Islam ..................... | H01Q 1/243 343/860 |
| 2013/0307731 | A1* | 11/2013 | Vanjani .................. | H01Q 1/243 343/700 MS |
| 2014/0125547 | A1* | 5/2014 | Liu ........................ | H01Q 7/005 343/866 |

* cited by examiner

*Primary Examiner* — Hoanganh Le
(74) *Attorney, Agent, or Firm* — Na Xu; IPro, PLLC

(57) ABSTRACT

A mobile communication device includes a metallic housing, a main board mounted within the metallic housing, and an antenna portion and a grounding portion, the antenna portion including at least a first antenna and a second antenna, wherein these antennas share a common radiation part formed by a metallic cover piece, a metallic surrounding piece, an insulating piece, and a connection piece; the cover piece is grounded, the grounding portion including a first grounding point and a second grounding point both provided on the main board, respectively located laterally to the connection piece and abutting against the metallic surrounding piece. A corresponding manufacturing method of the mobile communication device is also related.

17 Claims, 5 Drawing Sheets

MOBILE COMMUNICATION DEVICE AND MANUFACTURING METHOD THEREOF

FIELD OF THE INVENTION

The disclosure described herein relates to the field of communication technologies, and more particularly to mobile communication devices and a manufacturing method of such a mobile communication device.

DESCRIPTION OF RELATED ART

Nowadays, a mobile communication device, such as a phone, or a tablet PC, with a metallic housing, is widely accepted and desired by users, by virtue of the fashion appearances. Compared with other housings made of other materials, metallic housings not only have a fashion appearance, but also have many other advantages, such as better stiffness, greater strength, thinner thickness, recyclable, better heat dissipation and so on.

A mobile communication device related to the present disclosure includes a metallic shell and several antennas within the metallic shell. The metallic shell includes a metallic cover, a metallic rear housing and a metallic surrounding piece, which are connected with each other. The metallic cover or the metallic surrounding piece is generally configured as a radiation part for these antennas in the metallic shell. However, the resonant frequency bands of these antennas are nonadjustable, especially when the metallic cover and the metallic surrounding piece are both provided with fixed lengths. Moreover, there is a poor isolation degree among those antennas.

The present disclosure is accordingly provided to solve the problems mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

Figure 1:
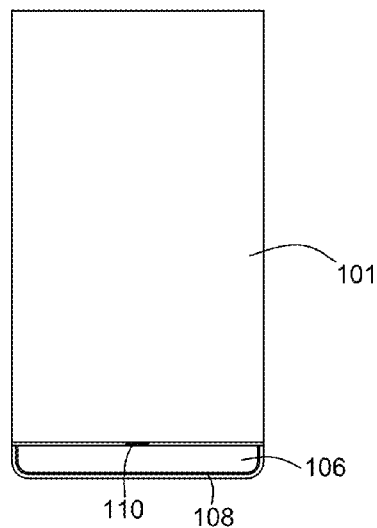
FIG. 1 is a simplified illustration of a mobile communication device in accordance with an exemplary embodiment of the present disclosure.
Figure 2:
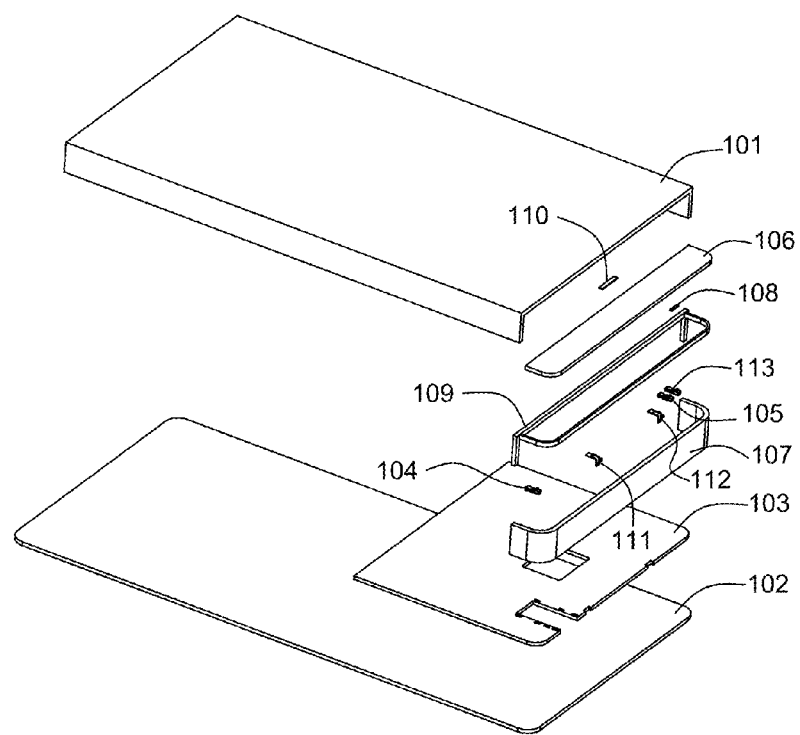
FIG. 2 is an exploded illustration of the mobile communication device shown in FIG. 1.

The present invention will hereinafter be described in detail with reference to an exemplary embodiment.

Referring to FIGS. 1-6, a mobile communication device 100 in accordance with an exemplary embodiment of the present invention is provided. Herein, the mobile communication device 100 includes a screen 102 and a metallic housing 101 structurally connecting with the screen 102. The mobile communication device 100 further includes an antenna portion and a main board 103 for data processing. The main board 103 is received within the metallic housing 101. In this embodiment, the antenna portion includes at least a first antenna and a second antenna, and the first antenna and the second antenna share a common radiation part. In addition, the first antenna also includes a first feed point 104, and the second antenna also includes a second feed point 105, wherein the first feed point 104 and the second feed point 105 are respectively arranged on the main board 103. The main board 103 is provided with data processing circuitries respectively corresponding to the first feed point 104 and the second feed point 105. The mobile communication device 100 also includes a grounding portion, including a first grounding point 111 connecting to the first antenna, and a second grounding point 112 connecting to the second antenna.

Figure 3:
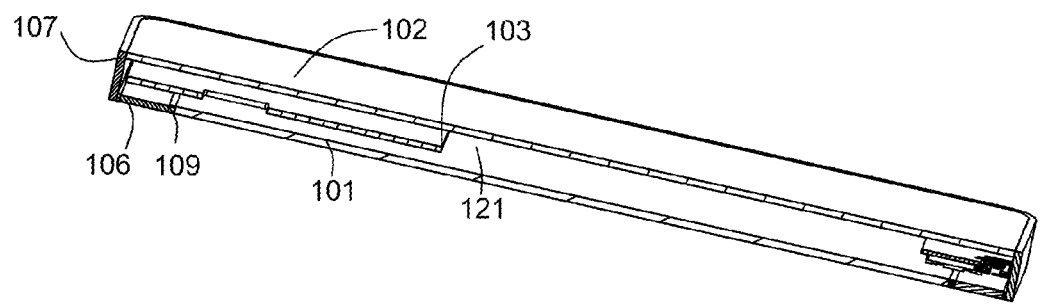
FIG. 3 illustrates a cutaway view of the mobile communication device shown in FIG. 1.

As shown in FIG. 3, a receiving space 121 is formed by the screen 102, the metallic housing 101, a metallic cover piece 106, a metallic surrounding piece 107 and an insulating piece 109, and at least the main board 103 is accommodated in the receiving space 121.

Figure 4:
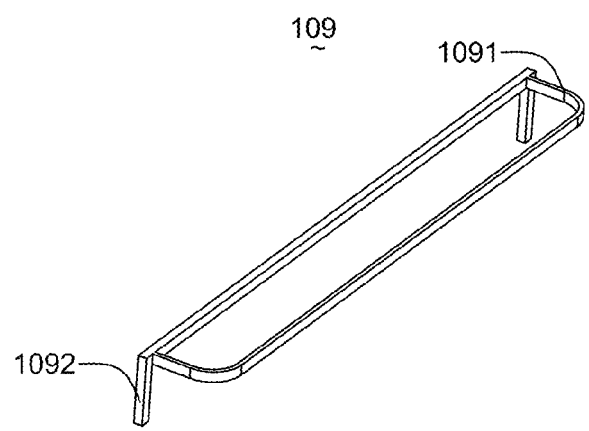
FIG. 4 illustrates an insulating piece used in the mobile communication device shown in FIG. 2.

Specifically, the common radiation part includes the metallic cover piece 106, the metallic surrounding piece 107, the insulating piece 109 and a connection piece 108. The metallic cover piece 106 connects to a first end of the metallic housing 101 and parallel to the screen 102. The metallic surrounding piece 107 connects to both the metallic housing 101 and the metallic cover piece 106. The insulating piece 109 is provided for forming isolations between any two of the metallic housing 101, the metallic cover piece 106 and the metallic surrounding piece 107. As shown in FIG. 4, the insulating piece 109 includes a holding portion 1091 for supporting the metallic cover piece 106 and an extending portion 1092 sandwiched between the metallic housing 101 and the metallic surrounding piece 107, the extending portion 1092 extending perpendicularly to the holding portion 1091. In this case, the holding portion 1091 isolates the metallic cover piece 106 from the metallic housing 101 and the metallic surrounding piece 107. The extending portion 1092 respectively abuts against the metallic housing 101, the screen 102 and the metallic surrounding piece 107, so as to form isolations between the metallic surrounding piece 107 and the metallic housing 101.

The connection piece 108 is arranged on the insulating piece 109, especially on the holding portion 1091 between the metallic cover piece 106 and the metallic surrounding piece 107. One end of the connection piece 108 abuts against the metallic cover piece 106, and the other end of the connection piece 108 abuts against the metallic surrounding piece 107. In this case, the connection piece 108 serves as a conductor for electrically connecting the metallic cover piece 106 to the metallic surrounding piece 107.

The metallic cover piece 106 is grounded. For example in this embodiment, a metallic plate 110 is positioned between the metallic cover piece 106 and the metallic housing 101, and the metallic housing 101 is electrically connected to the main board 103, especially to a grounding point on the main board 103, and thus the metallic cover piece 106 can be grounded, as the metallic cover piece 106 can be electrically connected to the metallic housing 101 through the metallic plate 110 and further connected to the main board 103. In an optional way, the metallic plate 110 is arranged on the insulating piece 109, with one end thereof abutting against the metallic housing 101 and the other end thereof abutting against the metallic cover piece 106. Alternatively, the metallic cover piece 106 can be directly connected to the grounding point on the main board 103 for example by a metallic terminal, which however will badly affect the resonant frequencies of the antenna.

Figure 5:
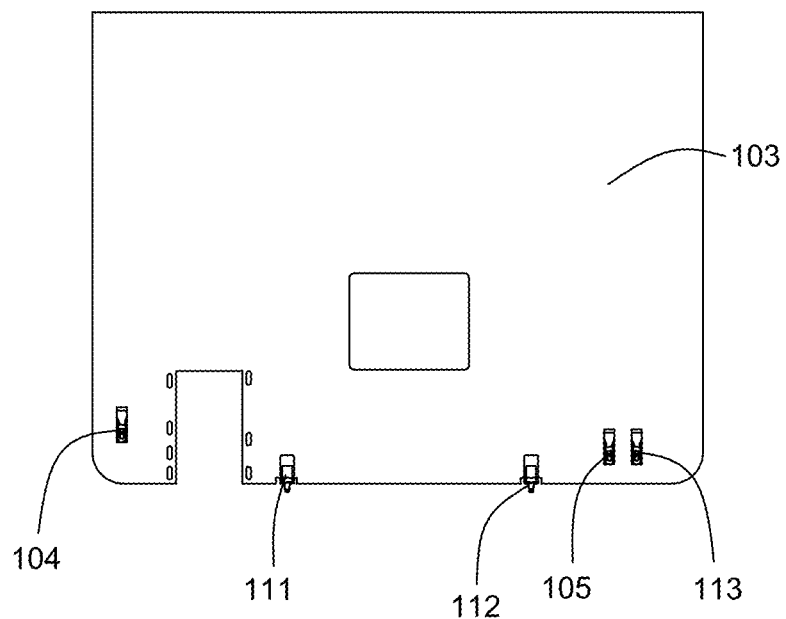
FIG. 5 illustrates a partial assembly view of the mobile communication device shown in FIG. 2.

Additionally, as shown in FIG. 5, in order to improve the isolation degree between the first antenna and the second antenna, the first grounding point 111 and the second grounding point 112 are provided on the main board 103, especially laterally to the connection piece 108 and both abutting against the metallic surrounding piece 107.

Figure 6:
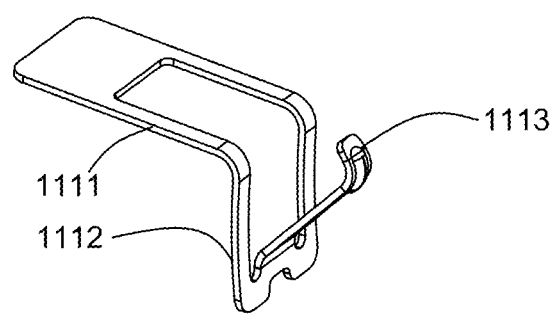
FIG. 6 illustrates a detailed view of a first grounding point used in the mobile communication device shown in FIG. 2.

Referring to FIG. 6, the first grounding point 111 comprises a fixing part 1111 parallel with the main board 103, a snap part 1112 vertically extending from an end of the fixing part 1111 and a connecting part 1113 extending from an end of the snap part 1112 in a direction away from the snap part 1112 and towards the metallic surrounding piece 107. Referring FIG. 6 together with FIG. 5, it can be seen that the first grounding point 111 is fixed on the main board 103 by snap fitting, and the connecting part 1113 can be resilient so as to steadily abut against the metallic surrounding piece 107. Accordingly, the second grounding point 112 can be provided with a similar structure to the first grounding point 111.

With the above-mentioned structure of the mobile communication device, the metallic surrounding piece 107 and the metallic cover piece 106 are both be divided in to two parts by the connection piece 108. The first feed point 104 and the second feed point 105 are respectively connected to those two parts, so that one of those two parts can function as a radiator of the first antenna and the other can function as that of the second antenna.

The first antenna may be a WIFI antenna and/or a GPS antenna, i.e., the first antenna can be provided with a band coverage of WIFI frequency bands and/or GPS frequency bands. The second antenna may be a diversity antenna, which covers a band from 1805 MHz to 2690 MHz.

Figure 7:
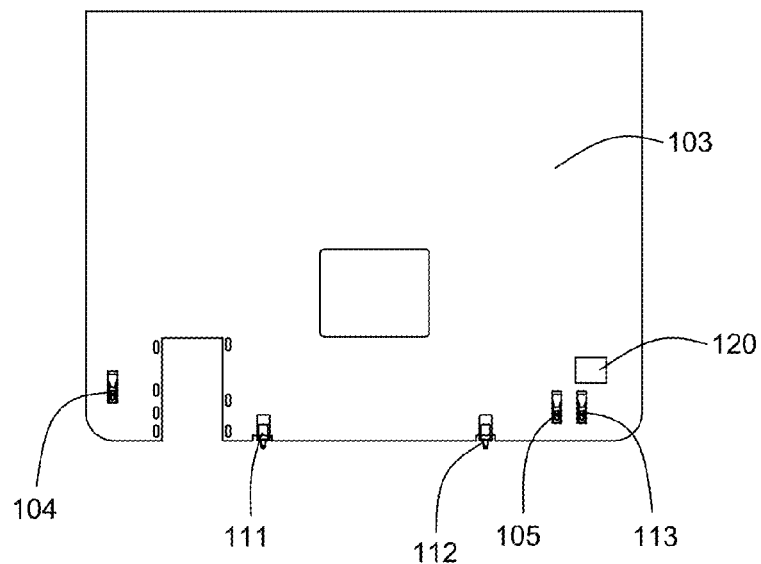
FIG. 7 is similar to FIG. 5, but a parasitic antenna assembled therewith.

In addition, as shown in FIG. 7, in another exemplary embodiment, the first antenna further comprises a parasitic antenna 120 on the main board 103, coupling with the metallic cover piece 106 or the metallic surrounding piece 107. Correspondingly, a grounding foot 113 for the parasitic antenna 120 is positioned on the main board 103. The parasitic antenna 120 is arranged at a position corresponding to the metallic cover piece 106. With the parasitic antenna 120 coupling with the metallic cover piece 106 or the metallic surrounding piece 107, a higher resonant frequency may be generated, which may be as much as 5 GHz for example.

A method of manufacturing the mobile communication device mentioned above is also provided in this disclosure. The method includes the steps as following.

Firstly, a metallic housing 101 and a main board 103 are provided. A screen 102 is connected with the housing 101, and the main board 103 is to be arranged in the housing 101.

Then, an antenna portion is to be formed by providing a common radiation part and a feed part. The feed part includes at least a first feed point 104 and a second feed point 105, and those feed points are respectively mounted on the main board 103. In order to form the radiation part, a metallic cover piece 106 connects to the metallic housing, a metallic surrounding piece 107 connects to both the metallic housing 101 and the metallic cover piece 106, a insulating piece 109 is arranged for forming isolations between any two of the metallic housing 101, the metallic cover piece 106 and the metallic surrounding piece 107, and a connection piece 108 is mounted between the metallic cover piece 106 and the metallic surrounding piece 107 so as to electrically connect the metallic cover piece 106 to the metallic surrounding piece 107. Additionally, the metallic cover piece 106 is grounded. The first feed point 104 and the second feed point 105 are respectively located laterally to the connection piece 108 and both abutting against the metallic cover piece 107.

Furthermore, a first grounding point 111 and a second grounding point 112 are mounted on the main board 103, laterally to the connection piece 108 and abutting against the metallic surrounding piece 107. As a receiving space 121 is formed by the screen 102, the metallic housing 101, the metallic cover piece 106, the metallic surrounding piece 107 and the insulating piece 109, at least the main board 103 is accommodated in the receiving space 121.

Consequently, at least the common radiation part and the first feed point 104 form a first antenna, and at least the common radiation part and the second feed point 105 form a second antenna. Advantageously, the first antenna is a WIFI antenna and/or a GPS antenna. The second antenna may be a diversity antenna In an optional following step, a parasitic antenna 120 is provided on the main board 103 and coupled with the metallic cover piece 106 or the metallic surrounding piece 107.

Then, the connection piece 108 may be arranged on a first position of the insulating piece 109, and by adjusting the first position on the insulating piece 109, a WIFI frequency band of the first antenna can be achieved. Advantageously, a metallic plate 110 is positioned on a second position of the insulating piece 109 between the metallic cover piece 106 and the metallic housing 101, so that the metallic cover piece 106 can be grounded as the metallic cover piece 106 can be electrically connected to the metallic housing 101 through the metallic plate 110 and then connected to the main board 103 which is grounded in any cases. By adjusting the second position on the insulating piece 109, it is possible to operate resonance regulating on the antenna portion.

Figure 8:
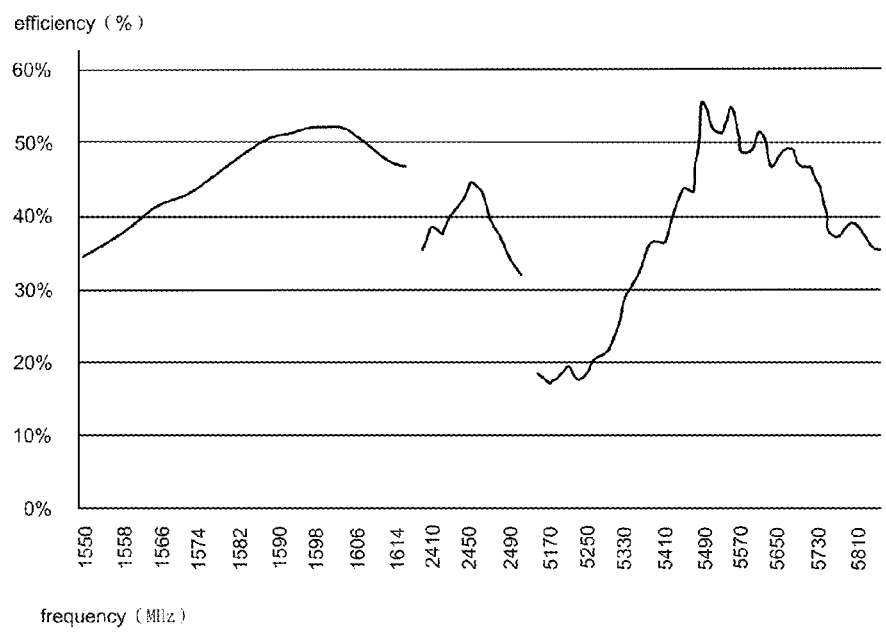
FIG. 8 illustrates the performance of a first antenna of the mobile communication device in FIG. 7.

Referring to FIG. 8, after adjusting the first position of the connection piece 108, the mobile communication device 100 can operate over a WIFI frequency band of around 2.4 GHz, with an average efficiency of about 39%. By adjusting the second position of the metallic plate 110, the mobile communication device 100 can operate over a GPS frequency band of 1550-1615 GHz, with an average efficiency of 46%. Furthermore, with the parasitic antenna 120, the mobile communication device 100 can operate over a WIFI frequency band of around 5 GHz, with an average efficiency of 37%.

Figure 9:
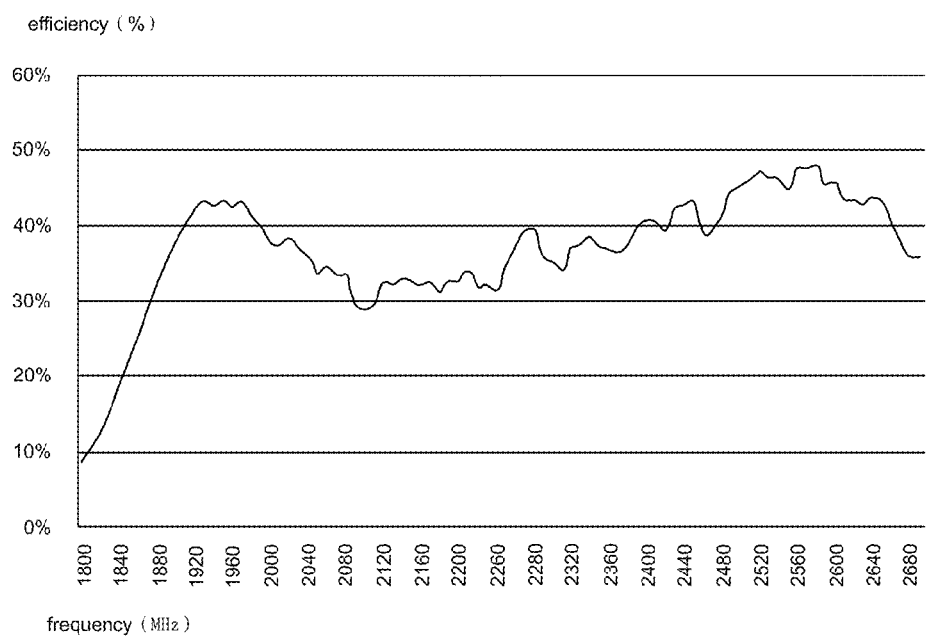
FIG. 9 illustrates the performance of a second antenna of the mobile communication device in FIG. 7.

Referring to FIG. 9, the efficiency of the second antenna is illustrated. The frequency of the second antenna, i.e. the diversity antenna, covers a frequency band from 1805 MHz to 2690 MHz, with an average efficiency of 37%.

Furthermore, with the grounding points 111 and 112 on the main board 103, the isolation degree between the first antenna and the second antenna are smaller than −15 dB at all the working frequency bands, thus meeting the corresponding requirement of the mobile communication device 100. Details are shown in table 1.

TABLE 1

| | Frequency(MHz) | | | | | | | |
|---|---|---|---|---|---|---|---|---|
| | 1575 | 1805 | 2170 | 2500 | 2690 | 5150 | 5.73 | 5.83 |
| Isolation degree(dB) | −17.79 | −25.35 | −18.75 | −26.84 | −23.06 | −20.04 | −33.65 | −34.27 |

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mobile communication device, comprising:
a metallic housing;
a main board mounted within the metallic housing;
an antenna portion, comprising a common radiation part and a feed part on the main board, the common radiation part comprising a metallic cover piece which is grounded and connects to the metallic housing, a metallic surrounding piece connecting to both the metallic housing and the metallic cover piece, an insulating piece for forming isolation between any two of the metallic housing, the metallic cover piece and the metallic surrounding piece, and a connection piece for electrically connecting the metallic cover piece to the metallic surrounding piece, the feed part comprising at least a first feed point and a second feed point respectively mounted on the main board, laterally to the connection piece and abutting against the metallic cover piece;
and a grounding portion, comprising a first grounding point and a second grounding point both provided on the main board, respectively located laterally to the connection piece and abutting against the metal surrounding piece.

2. The mobile communication device as described in claim 1, wherein the insulating piece comprises a holding portion for supporting the metallic cover piece, and a extending portion sandwiched between the metallic housing and the metallic surrounding piece, extending perpendicularly to the holding portion.

3. The mobile communication device as described in claim 2, wherein, the connection piece is arranged on the insulating piece.

4. The mobile communication device as described in claim 3, wherein at least the common radiation part and the first feed point serve as a first antenna, at least the common radiation part and the second feed point serve as a second antenna.

5. The mobile communication device as described in claim 4, wherein the first antenna is a WIFI antenna and/or a GPS antenna.

6. The mobile communication device as described in claim 5, wherein the second antenna is a diversity antenna.

7. The mobile communication device as described in claim 5, wherein the first antenna further comprises a parasitic antenna on the main board, coupling with the metallic cover piece or the metallic surrounding piece.

8. The mobile communication device as described in claim 7, wherein the second antenna is a diversity antenna.

9. The mobile communication device as described in claim 8, wherein a receiving space is formed by the metallic housing, the metallic cover piece, the metallic surrounding piece and the insulating piece, and the main board is accommodated in the receiving space.

10. A method of manufacturing a mobile communication device, comprising the steps of:
providing a metallic housing and a main board received in the metallic housing;
forming an antenna portion by providing a common radiation part and a feed part, the common radiation part comprising a metallic cover piece which is grounded and connects to the metallic housing, a metallic surrounding piece which connects to both the metallic housing and the metallic cover piece, an insulating piece for forming isolations between any two of the metallic housing, the metallic cover piece and the metallic surrounding piece, and a connection piece for electrically connecting the metallic cover piece to the metallic surrounding piece; the feed part comprising at least a first feed point and a second feed point respectively mounted on the main board, laterally to the connection piece and abutting against the metallic cover piece;
and providing a first grounding point and a second grounding point on the main board, by respectively locating those grounding points laterally to the connection piece and further making those grounding points abut against the metallic surrounding piece.

11. The method of manufacturing a mobile communication device as described in claim 10, wherein the common radiation part and the first feed point cooperatively form a first antenna, and the common radiation part and the second feed point cooperatively form a second antenna.

12. The method of manufacturing a mobile communication device as described in claim 11, wherein the first antenna is a WIFI antenna and/or a GPS antenna.

13. The method of manufacturing a mobile communication device as described in claim 12, further comprising the step of providing a parasitic antenna on the main board and coupling the parasitic antenna with the metallic cover piece or the metallic surrounding piece.

14. The method of manufacturing a mobile communication device as described in claim 13, wherein the second antenna is a diversity antenna.

15. The method of manufacturing a mobile communication device as described in claim 14, further comprising the step of arranging the connection piece on a first position of the insulating piece, and achieving a WIFI frequency band of the first antenna by adjusting the first position.

16. The method of manufacturing a mobile communication device as described in claim 15, further comprising providing a metallic plate on a second position of the insulating piece for connecting the metallic cover piece to the metallic housing, and adjusting the second position to operate resonance regulating on the antenna portion.

17. The method of manufacturing a mobile communication device as described in claim 16, further comprising the step of forming a receiving space with the metallic housing, the metallic cover piece, the metallic surrounding piece and the insulating piece, and accommodating the main board in the receiving space.

\* \* \* \* \*